US007871531B2

(12) United States Patent
Sugimoto

(10) Patent No.: US 7,871,531 B2
(45) Date of Patent: Jan. 18, 2011

(54) METHOD OF MANUFACTURING LIQUID EJECTION HEAD

(75) Inventor: Shinya Sugimoto, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 604 days.

(21) Appl. No.: 11/902,907

(22) Filed: Sep. 26, 2007

(65) Prior Publication Data

US 2008/0073319 A1 Mar. 27, 2008

(30) Foreign Application Priority Data

Sep. 27, 2006 (JP) ............................ 2006-263482

(51) Int. Cl.
*G01D 15/00* (2006.01)
*G11B 5/127* (2006.01)

(52) U.S. Cl. ........................................................ 216/27

(58) Field of Classification Search ....................... None
See application file for complete search history.

(56) References Cited

U.S. PATENT DOCUMENTS

| | | | | |
|---|---|---|---|---|
| 5,723,053 | A | 3/1998 | Momose et al. | |
| 5,956,058 | A | 9/1999 | Momose et al. | |
| 6,594,898 | B1 * | 7/2003 | Yun | 29/890.1 |
| 2006/0044347 | A1 * | 3/2006 | Kwon et al. | 347/44 |

FOREIGN PATENT DOCUMENTS

JP 7-132595 A 5/1995

OTHER PUBLICATIONS

JP 07-132595 Machine Translation.*
JP 07-132595 Machine Translation of Miura et al (JP 07-132595) May 23, 1995.*

* cited by examiner

*Primary Examiner*—Binh X Tran
*Assistant Examiner*—Stephanie Duclair
(74) *Attorney, Agent, or Firm*—Birch, Stewart, Kolasch & Birch, LLP

(57) ABSTRACT

A method of manufacturing a liquid ejection head in which a pressure chamber for storing an ejection liquid is connected with an ink supply channel through a restrictor, includes the steps of: forming first spaces for the liquid supply channel and the pressure chamber in a silicon substrate by performing anisotropic etching on a surface of the silicon substrate, the surface of the silicon substrate being parallel to a Si(110) plane, each of the first spaces being defined by two vertical walls and two inclined walls, each of the two vertical walls being parallel to a Si(111) plane that is perpendicular to the surface of the silicon substrate, each of the two inclined walls being parallel to a Si(111) plane that is inclined with respect to the surface of the silicon substrate; then forming an etching protection film on the silicon substrate, the etching protection film protecting the silicon substrate from being etched; then forming an opening corresponding to a second space for the restrictor in the etching protection film; and then performing anisotropic etching on the surface of the silicon substrate through the opening of the etching protection film to form the second space in the silicon substrate, the second space for the restrictor being defined by two inclined walls each of which is parallel to the Si(111) plane that is inclined with respect to the surface of the silicon substrate, the second space connecting the first spaces for the liquid supply channel and the pressure chamber with each other.

5 Claims, 13 Drawing Sheets

METHOD OF MANUFACTURING LIQUID EJECTION HEAD

BACKGROUND OF THE INVENTION

1. Field of the Invention

The present invention relates to a method of manufacturing a liquid ejection head, and more particularly to a method of manufacturing a liquid ejection head in which droplets of liquid are ejected from a nozzle connected to a pressure chamber by supplying liquid from a liquid supply channel to the pressure chamber and then applying pressure to the liquid inside the pressure chamber.

2. Description of the Related Art

A liquid ejection head (inkjet head) has been known in which ink is supplied to a pressure chamber from an ink tank via an ink supply channel, pressure is generated inside the pressure chamber by a pressure generating device, such as a piezoelectric element, and ink is thereby ejected from a nozzle (ejection port) connected to the pressure chamber.

Moreover, an inkjet recording apparatus (inkjet printer) has been known which includes an inkjet head having a plurality of nozzles and which forms an image on a recording medium by ejecting ink droplets towards the recording medium from the plurality of nozzles in the inkjet head, while moving the inkjet head described above and the recording medium relatively to each other.

In this way, in an inkjet recording printer, an image is formed by combining ink dots composed of ink droplets ejected from the nozzles and deposited on the recording medium. In recent years, there have been demands for increased image quality in an image (inkjet print) produced by the inkjet printers to the extent that the image quality of the inkjet print surpasses an image quality of a photographic print.

In response to these demands, various proposals have been made in the related art to arrange the nozzles and the pressure chambers connected to the nozzles at high density, and to form the supply channels, and the like, which supply ink to the pressure chambers, with high accuracy.

For example, Japanese Patent Application Publication No. 07-132595 discloses an inkjet head having a plurality of ink pressure chambers each of which has one end connected to an ink pool unit via an ink supply channel and has the other end connected to a nozzle which ejects ink droplets. In this inkjet head, each of the ink supply channels is defined by at least two wall faces being parallel to a Si(111) plane that is inclined with respect to the surface of a (110) silicon substrate (i.e., monocrystalline (singular-crystalline) silicon substrate whose surface is parallel to a Si(110) plane). Moreover, each of the pressure chambers is defined by at least two walls being parallel to a Si(111) plane that is perpendicular with respect to the surface of the (110) silicon substrate.

This method of manufacturing the inkjet head disclosed in Japanese Patent Application Publication No. 07-132595 is described below with reference to FIG. 16.

FIG. 16 is a plan diagram showing an enlarged view of the ink pool unit, the pressure chamber and the supply channel that are formed in the monocrystalline silicon substrate. A monocrystalline silicon substrate 100, whose surface is parallel to a Si(110) plane, is subjected to a thermal oxidation process, and the like, and is thereby covered with a film 200 of silicon oxide (i.e., Si oxide). The silicon oxide film 200 is selectively etched away, resulting in the formation of an etching mask composed of the silicon oxide film 200 on the monocrystalline silicon substrate 100. Thereupon, anisotropic wet etching is carried out using the etching mask of the silicon oxide film 200, thereby forming a cavity for a pressure chamber 101, a cavity for an ink pool unit 103, and a supply channel 102, as shown in FIG. 16. In this case, the pressure chamber 101 is defined by four walls: two of which are parallel to a Si(111) plane that is perpendicular to the surface of the monocrystalline silicon substrate 100; and the others (two walls having a forward-taper shape shown in FIG. 16) of which are parallel to a Si(111) plane that is inclined with respect to the monocrystalline silicon substrate 100. By continuing the wet etching process further, the forward-taper shaped walls (shown in FIG. 16) that are parallel to the Si(111) plane that is inclined with respect to the silicon substrate 100 disappear as the anisotropic etching progresses. Finally, the partition **204*a* between the pressure chamber 101 and the supply channel 102, and the partition 204*b* between the ink pool unit 103 and the supply channel 102 are etched by isotropic wet etching, thereby connecting the pressure chamber 101 with the supply channel 102, and the supply channel 102 with the ink pool section 103. In this isotropic etching operation, the film 200** of silicon oxide is also removed at the same time.

In the above-described method of manufacturing an inkjet head, the depth of the supply channel 102 is dependent on the width of the openings of the etching mask, and the accuracy of the shape and dimensions of the supply channel 102 is sought to be achieved as described above.

However, in the method for manufacturing the inkjet head described above, since the silicon substrate 100 is immersed in a wet etchant (liquid for wet etching) for a long period of time in order to remove the forward-taper shaped walls that are parallel to the Si(111) plane and define the cavity for the pressure chamber 101, then side etching proceeds below the etching mask, the (111) faces defining the recess sections of the supply channels 102 retreat, and the dimensions of the supply channels 102 diverge from the design values. Furthermore, generally, there is fluctuation in the wet etching rate within the same plane of a substrate, and hence there is a problem in that it is difficult to achieve dimensional accuracy.

Moreover, in the method of manufacturing an inkjet head described above, the previously formed supply channel 102 is subjected to isotropic wet etching together with the partitions **204*a* and partitions 204*b* when the isotropic wet etching process is carried out, the shape of the supply channel 102 is changed to an isotropic shape, and therefore it is difficult to maintain the original shape (anisotropic shape) of the supply channel 102**. Furthermore, due to the same reason as that stated above, it is difficult to achieve dimensional accuracy.

As described above, it is difficult to guarantee the shape, dimensions and dimensional accuracy of the flow channels after processing the flow channels, and hence fluctuation in the ink ejection characteristics arises. In particular, if the supply channel 102 is used as a supply restrictor (resistance flow channel section; also referred to as a "restrictor"), then this has significant effects on the ejection characteristics.

In the above-described method, by making the thickness of the partitions **204*a* and 204*b* the same as the thickness of the silicon oxide film 200 used as an etching mask, the silicon oxide film 200 is removed together with the partitions 204*a* and 204*b* when the isotropic wet etching is carried out. However, there often arises fluctuation in the etching rate within the same plane of the substrate, and therefore the fluctuation may arise in the etching rate between the partitions and the silicon oxide film. If the fluctuation arises in the etching rate between them, then there is a high possibility in that the substrate below the silicon oxide film 200** (namely, the portion of the silicon substrate that is not intended to be etched) is unintentionally etched away. Consequently, there is a problem in that the desired shape cannot be obtained, thereby adversely affecting the ejection characteristics.

SUMMARY OF THE INVENTION

The present invention has been contrived in view of these circumstances, an object of the present invention being to provide a method of manufacturing a liquid ejection head whereby it is possible to simultaneously achieve reduction of manufacturing costs, high-density arrangement of the pressure chambers, and guaranteed shape, dimensions and dimensional accuracy in the restrictors.

In order to attain the aforementioned object, the present invention is directed to a method of manufacturing a liquid ejection head including: a pressure chamber which stores liquid; a liquid supply channel which supplies the liquid to the pressure chamber; a restrictor which connects the liquid supply channel with the pressure chamber; and an ejection port which ejects droplets of the liquid in the pressure chamber supplied from the liquid supply channel through the restrictor, the method including the steps of: forming first spaces for the liquid supply channel and the pressure chamber in a silicon substrate by performing anisotropic etching on a surface of the silicon substrate, the surface of the silicon substrate being parallel to a Si(110) plane, each of the first spaces being defined by two vertical walls and two inclined walls, each of the two vertical walls being parallel to a Si(111) plane that is perpendicular to the surface of the silicon substrate, each of the two inclined walls being parallel to a Si(111) plane that is inclined with respect to the surface of the silicon substrate; then forming an etching protection film on the silicon substrate, the etching protection film protecting the silicon substrate from being etched; then forming an opening corresponding to a second space for the restrictor in the etching protection film; and then performing anisotropic etching on the surface of the silicon substrate through the opening of the etching protection film to form the second space in the silicon substrate, the second space for the restrictor being defined by two inclined walls each of which is parallel to the Si(111) plane that is inclined with respect to the surface of the silicon substrate, the second space connecting the first spaces for the liquid supply channel and the pressure chamber with each other.

By this means, it is possible to manufacture, at low cost, a liquid ejection head in which the pressure chambers are arranged at high density, while guaranteeing the shape, dimensions and dimensional accuracy of the restrictors.

Preferably, the opening of the etching protection film has a length longer than the second space; and the opening of the etching protection film has portions that overlap with the first spaces.

By this means, it is possible to ensure reliable and highly accurate connections between the restrictor and the ink supply channel and between the restrictor and the pressure chamber.

As described above, according to the present invention, it is possible to manufacture at low cost, a liquid ejection head in which the pressure chambers are arranged at high density, while guaranteeing the shape, dimensions and dimensional accuracy of the restrictors.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 9A and 9B are illustrative diagrams showing a method of manufacturing an inkjet head according to an embodiment of the present invention, in which FIG. 9A is a plan diagram and FIG. 9B is a cross-sectional diagram;

FIGS. 10A and 10B are also illustrative diagrams showing a method of manufacturing an inkjet head according to the present embodiment, in which FIG. 10A is a plan diagram and FIG. 10B is a cross-sectional diagram;

FIGS. 11A and 11B are also illustrative diagrams showing a method of manufacturing an inkjet head according to the present embodiment, in which FIG. 11A is a plan diagram and FIG. 11B is a cross-sectional diagram;

FIGS. 12A and 12B are also illustrative diagrams showing a method of manufacturing an inkjet head according to the present embodiment, in which FIG. 12A is a plan diagram and FIG. 12B is a cross-sectional diagram;

FIGS. 13A and 13B are also illustrative diagrams showing a method of manufacturing an inkjet head according to the present embodiment, in which FIG. 13A is a plan diagram and FIG. 13B is a cross-sectional diagram;

FIGS. 14A and 14B are also illustrative diagrams showing a method of manufacturing an inkjet head according to the present embodiment, in which FIG. 14A is a plan diagram and FIG. 14B is a cross-sectional diagram;

FIGS. 15A and 15B are also illustrative diagrams showing a method of manufacturing an inkjet head according to the present embodiment, in which FIG. 15A is a plan diagram and FIG. 15B is a cross-sectional diagram.

DETAILED DESCRIPTION OF THE PREFERRED EMBODIMENTS

Figure 1:
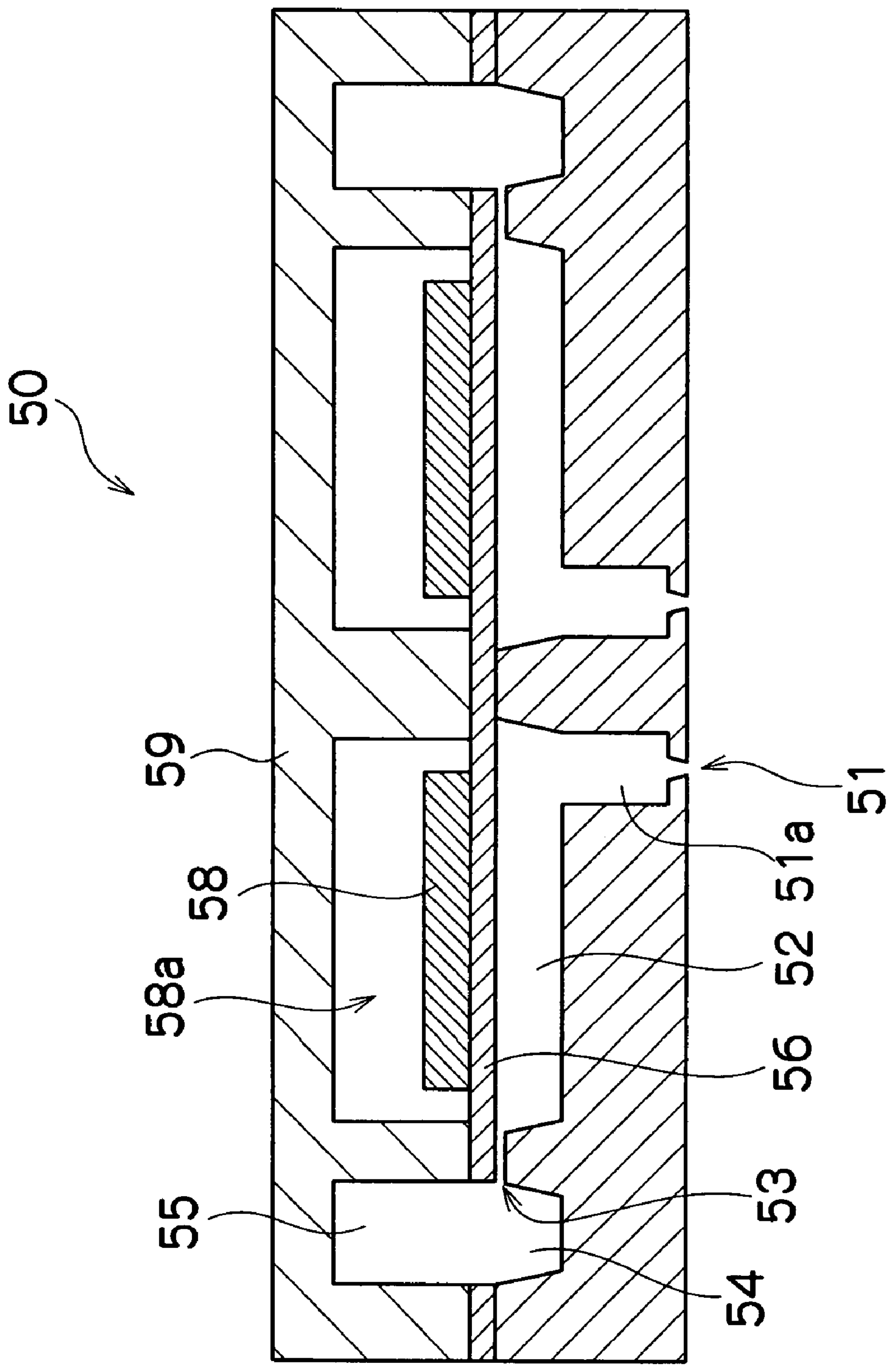
FIG. 1 is a cross-sectional diagram showing the vicinity of a pressure chamber in an inkjet head which forms a liquid ejection head manufactured by a method according to an embodiment of the present invention.

FIG. 1 is a cross-sectional diagram showing the peripheral areas of pressure chambers in an inkjet head 50 manufactured by means of a method according to an embodiment of the present invention.

In FIG. 1, the inkjet head 50 is laminated from a plurality of plates, and pressure chambers 52, ink supply channels 54, and the like, are formed in the inkjet head 50.

Each of the pressure chambers 52 is connected to a nozzle 51 via a nozzle flow channel 51*a* at one end thereof, and is connected to an ink supply channel 54 via a restrictor 53 at the other end thereof. The plurality of ink supply channels 54 are connected to a common liquid chamber 55. The common liquid channel 55 stores ink supplied from an ink tank (not shown in the drawings), and the common liquid channel 55 supplies the ink to each of the ink supply channels 54 serving as individual flow channels.

Furthermore, one surface (the ceiling in FIG. 1) of the pressure chamber 52 is constituted of a diaphragm 56, and a piezoelectric element 58 is bonded to the upper side of the diaphragm 56. The piezoelectric element 58 serves as an actuator and causes the diaphragm 56 to deform by applying a pressure to the diaphragm 56. Although not shown in FIG. 1, an individual electrode is formed on the upper face of the piezoelectric element 58. The diaphragm 56 also serves as a common electrode, and the piezoelectric element 58 is formed so as to be interposed between the common electrode (i.e., diaphragm 56) and the individual electrode.

By applying a drive voltage to the common electrode and the individual electrode, the piezoelectric element 58 is caused to deform. Due to this deformation of the piezoelectric element 58, the diaphragm 56 is pushed toward the pressure chamber 52, and the volume of the pressure chamber 52 is reduced and a pressure is applied to the ink accommodated in the pressure chamber 52, thereby ejecting ink droplets from the nozzle 51. When the voltage applied to the electrodes is released, the piezoelectric element 58 returns to its original state, the volume of the pressure chamber 52 reverts to its original size, and new ink is supplied to the pressure chamber 52 from the common liquid channel 55, via the ink supply channel 54 and the restrictor 53.

In order to maintain the shape of the piezoelectric element 58 and to protect the piezoelectric element 58, a piezo cover (an actuator cover) 59 is disposed over the diaphragm 56 and the piezoelectric element 58. A space 58*a* over the piezoelectric element 58 is defined by the piezo cover 59, thereby ensuring that the piezoelectric element 58 can be driven freely.

In the present specification, a method of manufacturing the inkjet head is described as one embodiment of the present invention, which is mainly directed to a method of manufacturing a liquid ejection head. First, introductory remarks are given with respect to typical examples of forming recess sections by anisotropic wet etching of a (110) silicon substrate (a silicon substrate whose surface is parallel to a (110) plane).

Below, a case is described in which a Si (110) surface (a (110) plane of the silicon substrate) is subjected to anisotropic wet etching with an etching mask having an opening of a substantially parallelogram shape, to form a recess section defined by at least two walls that are perpendicular to the Si (110) surface of the silicon substrate.

Figure 2:
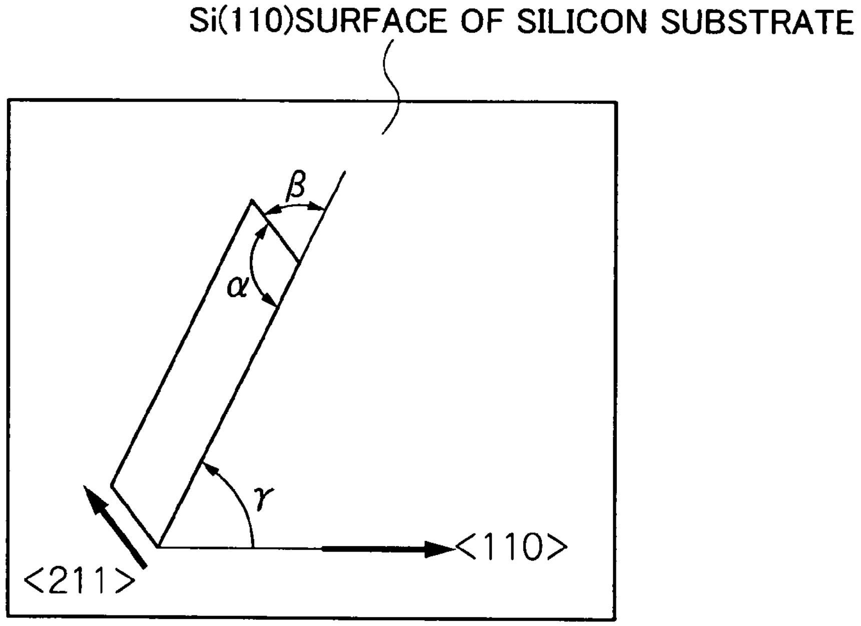
FIG. 2 is an illustrative diagram showing an example of an etching mask to be used when a (110) silicon substrate is subjected to anisotropic wet etching.

As shown in FIG. 2, the etching mask having an opening of a substantially parallelogram shape is formed on the surface of the silicon substrate (the Si (110) surface), and the anisotropic wet etching is carried out with respect to the Si (110) surface through the opening of the etching mask formed thereon, thereby obtaining the recess sections in the silicon substrate. In this case, the opening of the etching mask has four edges all of which are parallel to the <211> orientation (in other words, $\alpha=109.47°$ and $\beta=70.53°$ in FIG. 2), and the etching mask is formed so that a pair of edges of the opening are accurately positioned to be parallel to the <211> orientation (a pair of edges are aligned with the <211> orientation).

The opening of the etching mask is formed in an orientation where a pair of edges of the substantially parallelogram-shaped opening is rotated through an angle of $\gamma=54.74°$ with respect to the <110> orientation as indicated by the orientation flat (flat indicating a <110> direction) of the (110) silicon substrate, in the counter-clockwise direction, as shown in FIG. 2. As described above, in FIG. 2, the shape of the opening is $\alpha=109.47°$ and $\beta=70.53°$.

Figure 3:
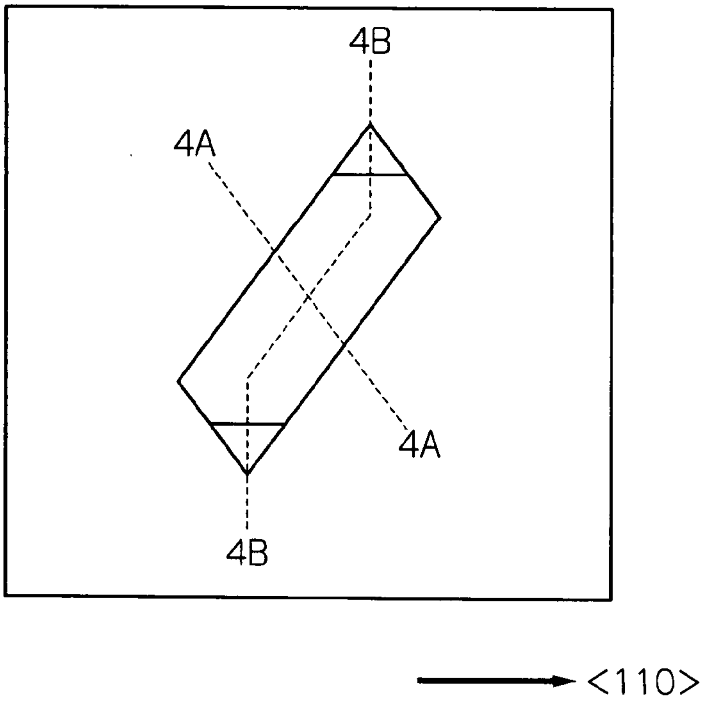
FIG. 3 is a plan diagram showing the (110) silicon substrate having been subjected to anisotropic wet etching with the etching mask shown in FIG. 2.
Figure 4A:
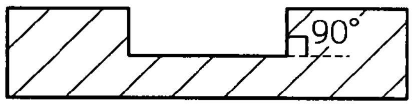
FIG. 4A is a cross-sectional diagram along line 4A-4A in FIG. 3.
Figure 4B:
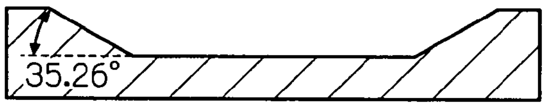
FIG. 4B is a cross-sectional diagram along line 4B-4B in FIG. 3.

The etched shapes (the shapes of the silicon substrate having been etched) obtained by carrying out anisotropic wet etching using the etching mask having the shape in FIG. 2 are shown in FIGS. 3, 4A, and 4B. FIG. 3 is a plan view showing the etched shape, FIG. 4A is a cross-sectional diagram along line 4A-4A in FIG. 3, and FIG. 4B is a cross-sectional diagram along line 4B-4B in FIG. 3.

As shown in FIG. 3, each of the four walls defining the substantially parallelogram-shaped recess sections formed by anisotropic etching is the (111) planes. More specifically, as shown in FIG. 4A, a cross-section taken along the line 4A-4A in FIG. 3 shows the pair of opposing walls ((111) planes) that are perpendicular (at 90°) with respect to the surface of the (110) silicon substrate. Similarly, as shown in FIG. 4B, the cross-section taken along line 4B-4B in FIG. 3 shows forward-taper shaped surfaces ((111) planes) that are inclined at an angle of 35.26° with respect to the surface of the (110) silicon substrate.

In this case, if the anisotropic wet etching is continued further, then the forward-taper shaped (111) faces disappear, and all of the walls defining the recess section become the (111) planes perpendicular to the surface of the (110) silicon substrate.

Next, a case is described in which a Si(110) surface (the surface of a (110) silicon substrate) is subjected to anisotropic wet etching with an etching mask having an opening of a substantially parallelogram shape, while the etching mask is formed in a different orientation to that of the case described above with reference to FIGS. 3 to 4B.

In this case, the Si (110) surface (the surface of the (110) silicon substrate) is subjected to anisotropic wet etching with an etching mask having an opening of a substantially parallelogram-shape. The opening of the etching mask has a pair of edges that are parallel with the <110> orientation and a pair of edges that are parallel with the <211> orientation. The etching mask is formed so that one edge of the opening that is parallel with the <110> orientation is aligned with the <110> orientation of the (110) silicon substrate.

Figure 5:
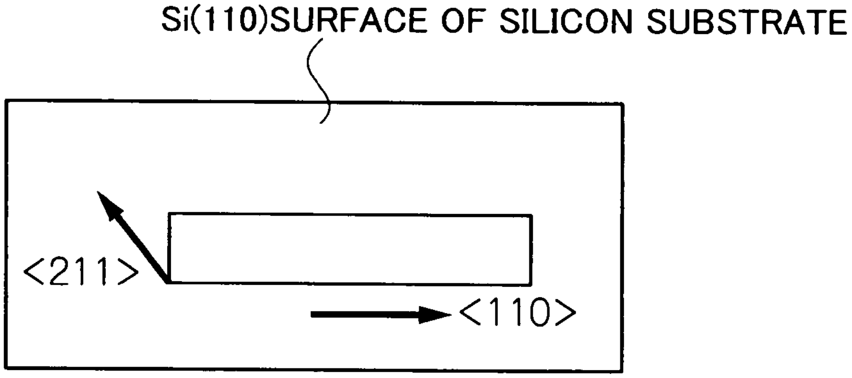
FIG. 5 is an illustrative diagram showing a further example of an etching mask to be used when the (110) silicon substrate is subjected to anisotropic wet etching.

When the opening of the etching mask has a shape of a substantial rectangle as shown in FIG. 5, it is also possible to obtain an etched shape similar to the above example in which the opening of the etching mask has a substantially parallelogram-shape. In this case, the etching mask is formed on the (110) silicon substrate so that the opening is parallel with the <110> orientation as indicated by the orientation flat of the (110) silicon substrate. The present example corresponds to a case where $\gamma=0°$ in FIG. 2.

Figure 6:
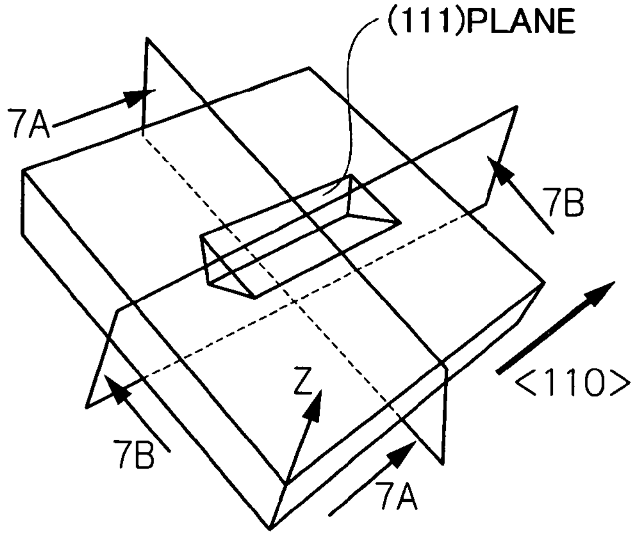
FIG. 6 is a perspective diagram showing the (110) silicon substrate having been subjected to anisotropic wet etching with the etching mask shown in FIG. 5.

FIG. 6 is a diagram showing a perspective view of the shape of the recess section formed by carrying out anisotropic wet etching using the above-described etching mask shown in FIG. 5. The cross-sectional shape of this recess section is a V shape (V-groove), and the walls thereof lie in the (111) plane.

Figure 7A:
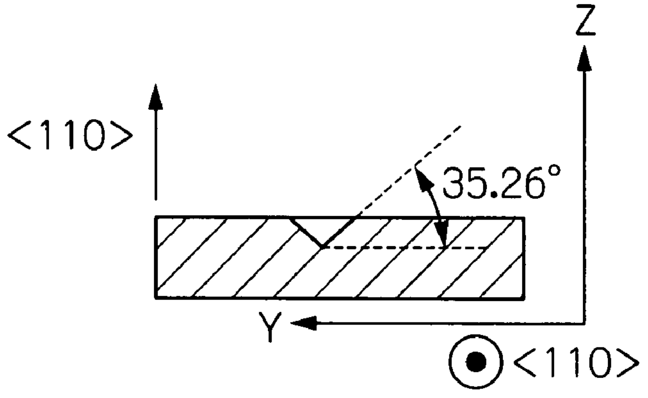
FIG. 7A is a cross-sectional diagram along plane 7A-7A in FIG. 6.
Figure 7B:
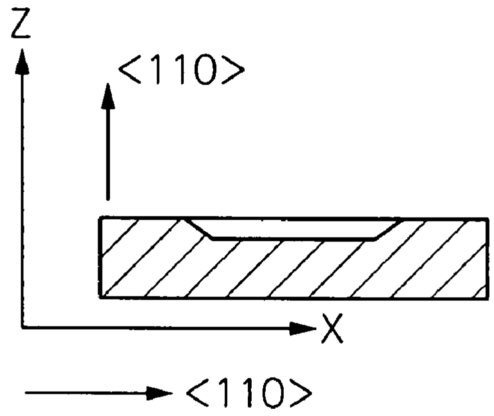
FIG. 7B is a cross-sectional diagram along plane 7B-7B in FIG. 6.
Figure 7C:
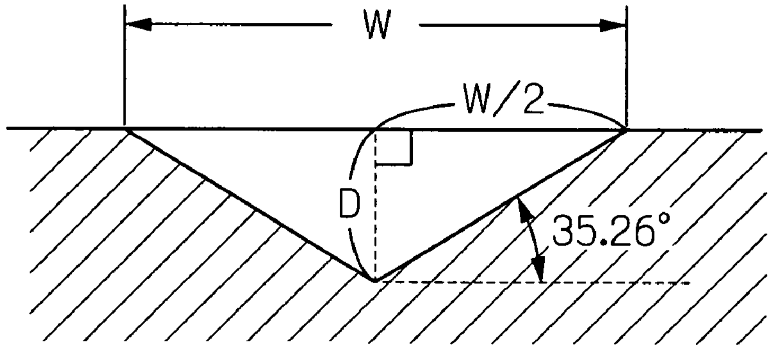
FIG. 7C is an enlarged diagram of the V-shaped section in FIG. 7A.

FIG. 7A is a diagram showing a cross-sectional view along plane 7A-7A in FIG. 6, and FIG. 7B is a diagram showing a cross-sectional view along plane 7B-7B in FIG. 6. Moreover, FIG. 7C is a diagram showing the enlarged cross-section of the V-groove in FIG. 7A. As shown in FIG. 7C, the depth D of the recess section is dependent on the width W of the opening in the <211> direction. In other words, as shown in FIG. 7C, there is the following relationship between D and W: $D=(W/2)\times\tan 35.26°$.

According to an embodiment of the present invention, it is possible to manufacture a liquid ejection head with a high-density arrangement of the pressure chambers at low cost, by combining the above-described two types of anisotropic wet etching with different etching masks. In other words, the present embodiment mainly has the following characteristics.

(a) In the present embodiment, wet etching is employed in order to reduce manufacturing costs.

(b1) In the present embodiment, a first type of anisotropic wet etching is carried out on a Si(110) surface of the (110) silicon substrate with an etching mask having an opening of a substantially parallelogram-shape, in order to form pressure chambers arranged at high density. In this case, the opening of etching mask has four edges that are parallel with the <211> orientations, and the etching mask is formed so that one of the four edges is aligned with the <211> direction of the (110) silicon substrate, as shown in FIG. 3. By means of this type of anisotropic wet etching, the recess sections (including spaces for the pressure chambers) are formed which are defined by the four walls: two of which are perpendicular to the surface of the (110) silicon substrate; and the others of which are inclined with respect to the surface of the (110) silicon substrate (forward-taper shaped walls), as shown in FIGS. 3, 4A, and 4B.

(b2) Thereupon, in order to form spaces for the restrictors, a second type of anisotropic wet etching is carried out on the Si(110) surface of the (110) silicon substrate with an etching mask having a substantially parallelogram-shape having a pair of edges parallel with the <110> orientation and a pair of edges parallel with the <211> orientation. In this case, the etching mask is formed so that one of the edges that are parallel with the <110> orientation is aligned with the <110> direction of the (110) silicon substrate, as shown in FIG. 5. By means of this type of anisotropic wet etching, the recess sections (spaces for the restrictors) having a V-shaped cross-section (V-groove) are formed as shown in FIGS. 6, 7A and 7B, and a depth of the V-groove is governed by the width of the opening of the etching mask as shown in 7C.

By combining the characteristics (a), (b1) and (b2) described above, it is possible to manufacture a liquid ejection head including the pressure chambers arranged at high-density and the restrictors, at low cost.

In the liquid ejection head having the "high-density arrangement of the pressure chambers" indicates: that the size of the partitions between the pressure chambers is reduced in cases where the partitions can be formed; in other words, that the pressure chambers are arranged at high density, and therefore the nozzles are arranged at high density. Furthermore, "at low cost" means that the liquid ejection head can be manufactured at low cost compared to a method in which a silicon substrate is processed by using a dry etching apparatus, or the like, which uses vacuum equipment. Since approximately 25 wafers can be processed in one batch in the case of a typical wet etching process, then manufacture can be completed inexpensively by means of the method according to the present embodiment, compared to dry etching process.

Moreover, by combining the characteristics described below, it is possible to guarantee the shape, dimensions and dimensional accuracy of the restrictors.

(c) In the present embodiment, in order to guarantee the shape, dimensions and dimensional accuracy of the restrictors, the second type of anisotropic etching described above is carried out according to the following specific steps (c1) to (c4).

More specifically, (c1) the recess sections (first spaces) (e.g., spaces for the pressure chambers) other than the restrictors are formed in the silicon substrate by performing the first type of anisotropic etching, (c2) an etching protection film is formed on the silicon substrate, (c3) an etching mask is formed from the etching protection film (more specifically, an opening corresponding to the restrictor is formed in the etching protection film by means of photolithography, resulting in the formation of the etching mask for forming the restrictor) by means of photolithography in which a photomask corresponding to the restrictors is aligned with the recess sections having been formed other than the restrictors, and (c4) finally, the second type of anisotropic wet etching is carried out to form the restrictors (second spaces) that connect the pressure chambers with the corresponding ink supply channels.

In the present embodiment, the restrictors (second spaces) are formed lastly, after forming recess sections (first spaces) (e.g., pressure chambers) which are of greater depth than the restrictors. In the present embodiment, the etching protective film in the step of (c2) is used as an etching mask in the step of (c4), and in addition to this, it is also used for etching protection in the length direction of the restrictors, in the etching step for connecting the restrictors with the recess sections other than the restrictors which have been formed in the step of (c1). Moreover, the photomask corresponding to the restrictors at the step of (c3) is designed in such a manner that each restrictor overlaps with the recess sections to which the restrictor is to be connected.

According to the process in (c) above, it is possible to specify the depth of the restrictors by the dimensions of the openings in the photomask, and it is possible to accurately specify the length of the restrictors by means of the dimensions of the photomask in step (c3) above (more specifically, the distance between the walls of the two flow channels). Therefore, it is possible to ensure the shape, dimensions and dimensional accuracy of the restrictors.

In general terms, by combining the characteristics (a), (b1), (b2) and (c) above, it is possible to reduce manufacturing costs while at the same time achieving a high-density arrangement of pressure chambers, as well as guaranteeing the shape, dimensions and dimensional accuracy of the restrictors.

Below, a method of manufacturing a liquid ejection head according to the present embodiment is described in more concrete terms, in particular with respect to the steps for manufacturing the ink supply channels 54, the pressure chambers 52 and the restrictors 53 which constitute the lower portion of the inkjet head shown in FIG. 1.

The ink supply channel 54 and the pressure chamber 52 are formed by anisotropic wet etching on a Si(110) surface of a monocrystalline silicon substrate, by using an etching mask having a substantially parallelogram-shaped opening aligned in the <211> orientation of the substrate as shown in FIG. 2. Thereupon, the silicon substrate is subjected to thermal oxidation, and a silicon nitride film is then formed, thereby creating an etching protective film for the subsequent anisotropic etching step. The etching mask having a substantially rectangular opening is then formed by subjecting the etching protective film to photolithography. In this case, the opening of the etching mask thus formed is aligned with the <110> direction with respect to the (110) silicon substrate as shown in FIG. 5. Finally, anisotropic wet etching is carried out using the etching mask described above, thereby forming a restrictor having a V-groove shape. The restrictor formed is defined by two walls that are parallel to the Si(111) planes, and the restrictor connects the ink supply channel 54 with the corresponding pressure chamber 52. When carrying out wet etching to form the restrictor in this way, the progress of wet etching in the length direction of the restrictor can be stopped by the protective film (etching mask) described above.

As described above, firstly, the first type of anisotropic wet etching is carried out on a Si(110) surface of a monocrystalline silicon substrate by using a substantially parallelogram-shaped etching mask, to form two recess sections, one of which is a space for one ink supply channel 54, and the other of which is a space for one pressure chamber 52. Thereupon, the second type of anisotropic wet etching is performed to form a restrictor which connects the two recess sections.

Figure 8:
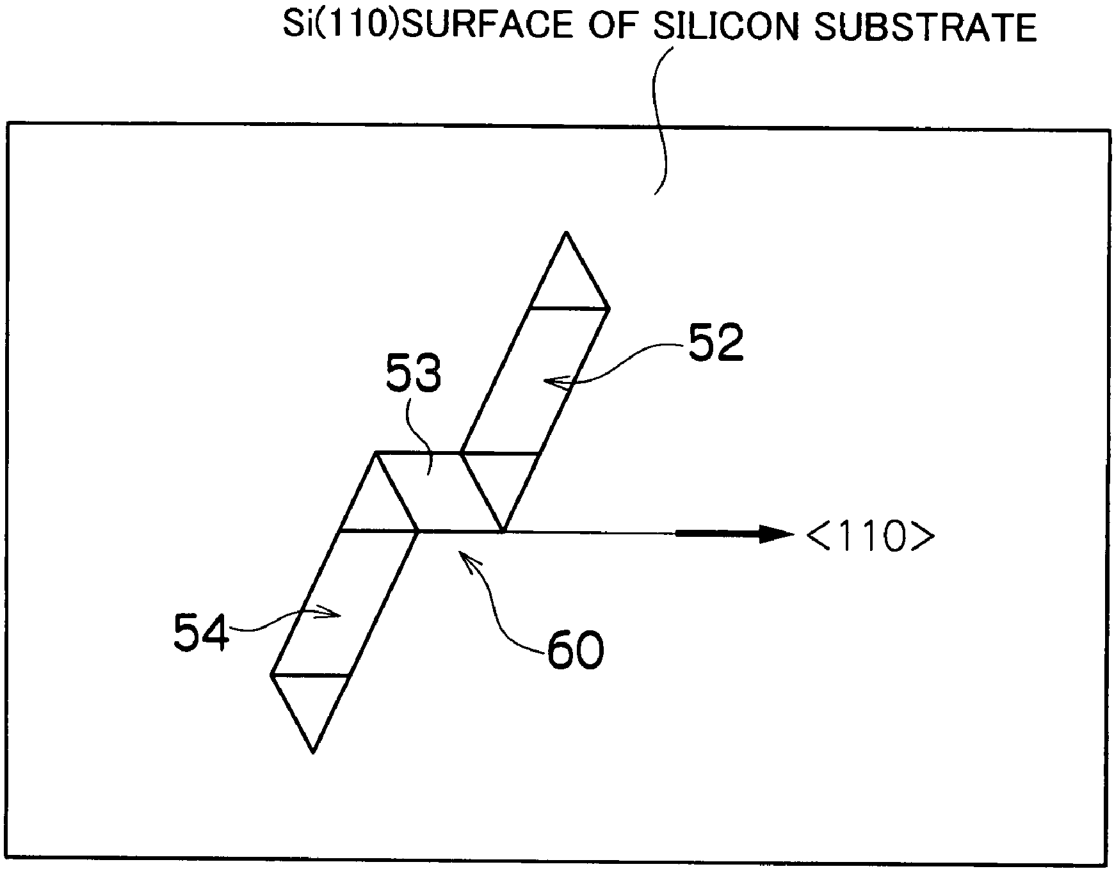
FIG. 8 is an illustrative diagram showing the positional relationship between an etching mask for forming a restrictor and two processed recess sections, one of which is to become an ink supply channel, and the other of which is to become a pressure chamber.

FIG. 8 is a diagram showing the positional relationship of an etching mask 60 used to form the restrictor 53, with respect to the ink supply channel 54 and the pressure chamber 52, which are the two recess sections having been formed.

Below, the steps of manufacturing the ink supply channels 54, the pressure chambers 52 and the restrictors 53 are described in detail with reference to FIGS. 9A to 15B.

FIGS. 9A to 15B are diagrams showing a method of forming a liquid ejection head according to an embodiment of the present invention. FIGS. 9A, 10A, 11A, 12A, 13A, 14A, and 15A are plan diagrams showing the liquid ejection head in the respective steps, and FIGS. 9B, 10B, 11B, 12B, 13B, 14B, and 15B are cross-sectional diagrams of the liquid ejection head in the respective steps, across the plane cut through the ink supply channel 54, the restrictor 53 and the pressure chamber 52, which are ultimately connected with each other as shown in FIG. 15A (or in FIG. 8).

Figure 9B:
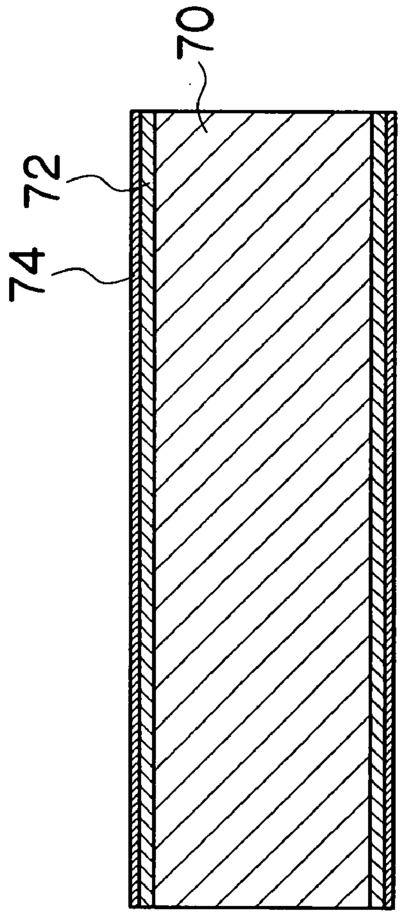
Figure 9A:
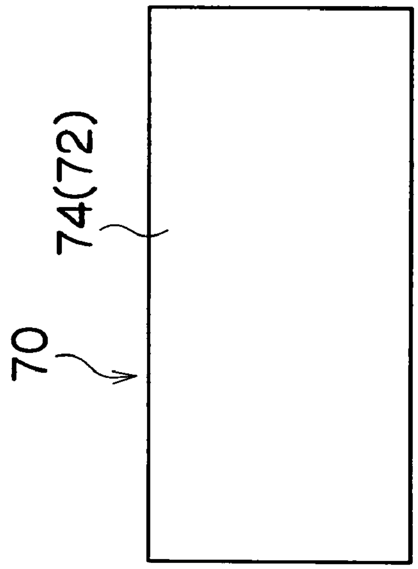
Figure 11A:
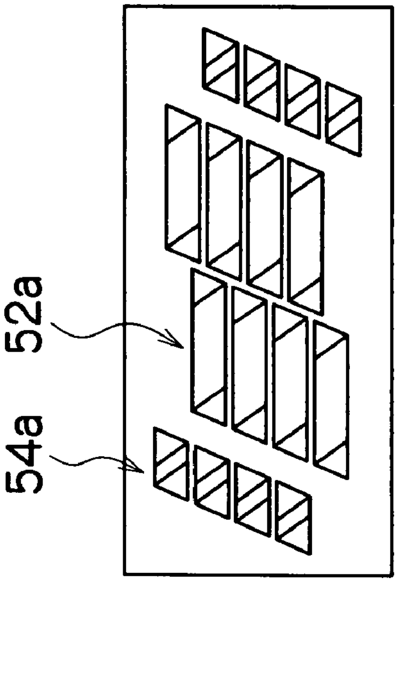
Figure 11B:
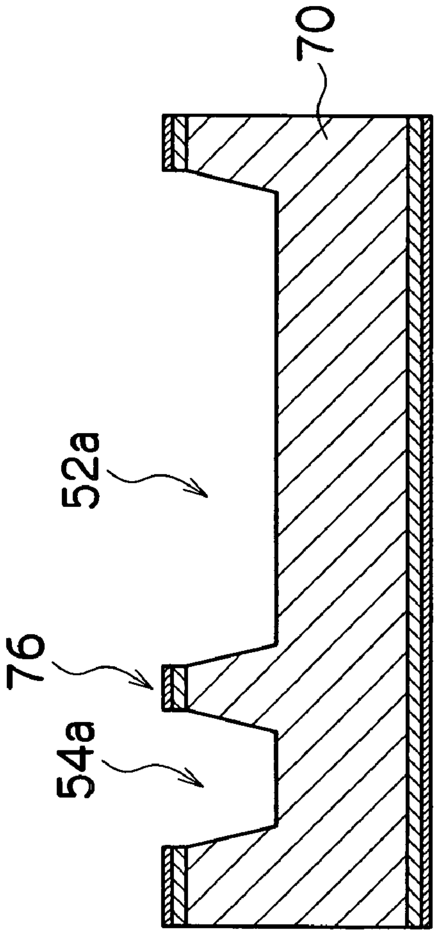
Figure 12B:
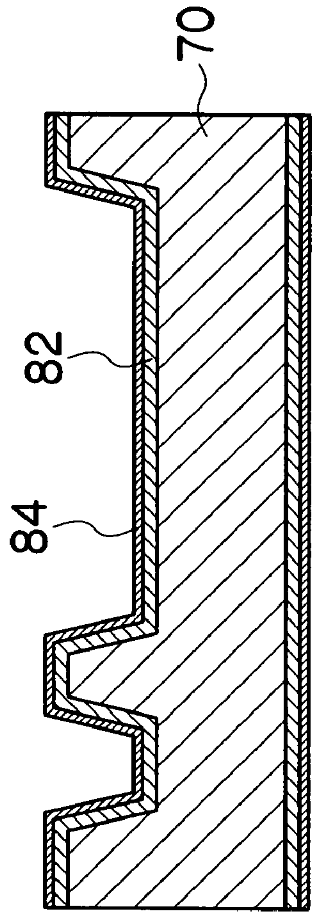
Figure 12A:
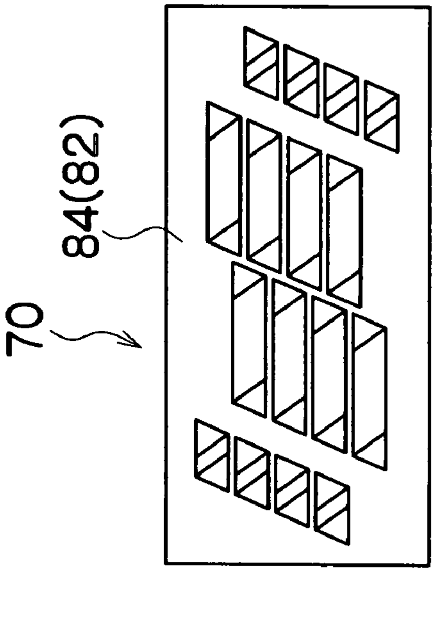

Firstly, in step (1) in FIGS. 9A and 9B (and especially, in FIG. 9B), a silicon substrate 70 having a surface parallel with a Si(110) plane is prepared, and after polishing both surfaces thereof, the silicon substrate 70 is subjected to thermal oxidation to form a silicon oxide film 72 to a thickness of 0.15 μm on the full surface of the silicon substrate 70. Thereupon, a silicon nitride film 74 which displays high durability with respect to etching by the aqueous potassium hydroxide solution to be used as a wet etchant (i.e., etching liquid) is formed to a thickness 0.1 μm, by CVD. The combination of the silicon oxide film 72 and the silicon nitride film 74 serves as an etching mask for anisotropic wet etching to form the ink supply channels 54 and the pressure chambers 52 which are illustrated in FIGS. 11A and 11B and described below. The silicon oxide film 72 also has the function of alleviating stress in the silicon nitride film 74.

Figure 10B:
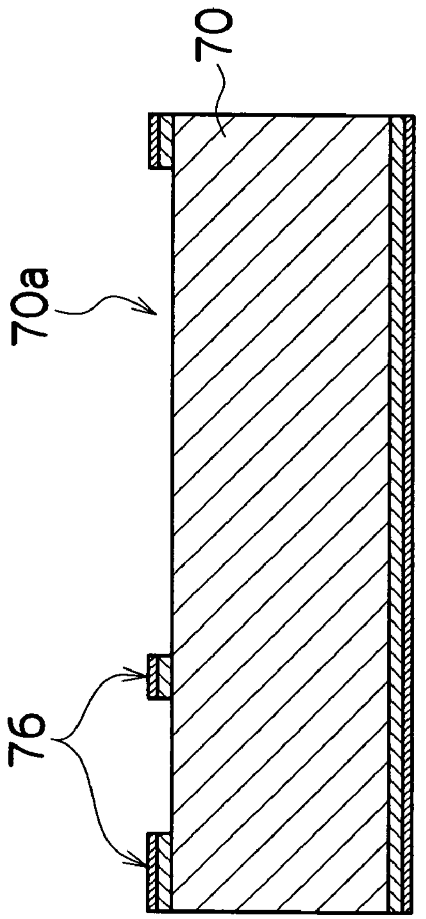
Figure 10A:
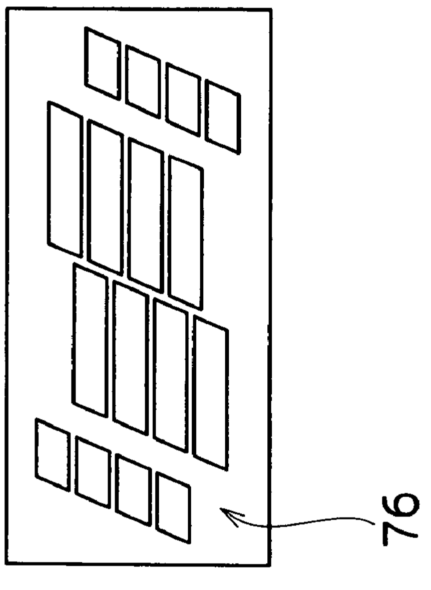

Thereupon, at step (2) shown in FIGS. 10A and 10B, the wet etching mask 76 is formed by photolithography. The wet etching mask 76 has substantially parallelogram-shaped openings for forming recess sections which are to become the ink supply channels 54 and the pressure chambers 52, and each of the openings is aligned with the <211> direction of the silicon substrate 70.

More specifically, the silicon substrate 70 (more accurately, the silicon nitride film 74 formed in step (1) above) is coated with a photosensitive photoresist by spin coating, and the photosensitive photoresist is patterned by using a photomask that has openings corresponding to the ink supply channels 54 and pressure chambers 52. Thereupon, the silicon nitride film 74 and the silicon oxide film 72 formed at step (1) are patterned by using the patterned photoresist. Finally, the photosensitive photoresist is removed by using a resist stripping solution, oxygen plasma, or the like, thereby forming openings corresponding to the ink supply channels 54 and the pressure chambers 52. Thus, the wet etching mask 76 having substantially parallelogram-shaped openings shown in FIG. 10A are formed, and the silicon surface 70*a* is thus exposed as shown in FIG. 10B.

In this case, the silicon nitride film 74 is patterned by wet etching with a hot phosphoric acid and the silicon oxide film 72 is patterned by wet etching with a fluorine-based wet etchant (etching liquid). Furthermore, it is also possible to use dry etching to pattern the silicon nitride film 74 and the silicon oxide film 72. In the dry etching of the silicon nitride film 74, it is possible to use a fluorine-based etching gas, such as $CF_4$, $CF_4$+$H_2$, $CH_2F_2$, $CH_3F$, $CHF_3$, or the like. In the dry etching of the silicon oxide film 72, it is possible to use a fluorine-based etching gas, such as $CF_4$+$H_2$, $CHF_3$, $C_2F_6$, or the like.

Thereupon, in step (3) shown in FIGS. 11A and 11B, recess sections 54*a* which are to become the ink supply channels 54 and recess sections 52*a* which are to become the pressure chambers 52 are formed by performing anisotropic wet etching.

In anisotropic wet etching, an aqueous solution of potassium hydroxide (KOH) is suitable for the etchant (etching liquid), since there is a large differential between the etching rate on the Si(111) plane and the etching rate on the other planes (including the Si(110) plane and the Si(100) plane) when KOH solution is used as the etchant. In general, in the case of an aqueous solution of potassium hydroxide, the ratio of the etching rate on the Si(100) plane to the Si(111) plane is represented by $R(100)/R(111)=400$, and the etching rates in different crystallographic planes have the mutual relationship of $R(110)>R(100)>>R(111)$.

The etching depth is controlled by time management. The etching rate of aqueous potassium hydroxide is 0.5 μm/min to 2.0 μm/min at the temperature of 60° C. to 80° C. The recess sections 52*a* which are to become the pressure chambers 52 having a height (depth) of 100 μm can be formed in approximately 60 minutes by performing anisotropic etching on the surface of silicon substrate 70 that is parallel to the Si(110) plane with an aqueous solution of potassium hydroxide having a temperature of 70° C. and concentration of 40% (etching rate: approximately 1.7 μm/min).

Moreover, the etching rate varies with the etching conditions, more specifically, the type, temperature and concentration of the etchant, or the state of agitation, and therefore it is also possible to provide an etching stop layer in order that etching is halted at an intended depth.

Each of the two recess sections is defined by four walls that are parallel with (111) planes: one pair of the walls follow a (111) plane that are perpendicular to the surface of the silicon substrate 70; and the other pair of the walls (forward-taper-shaped walls) follow a (111) plane that is inclined at an angle of 35.26° with respect to the surface of the (110) silicon substrate 70.

The silicon nitride film 74 and the silicon oxide film 72 used in step (3) as the wet etching mask, are then removed by means of the method described in step (2) above. Thereupon, at step (4) shown in FIGS. 12A and 12B, the silicon substrate 70 is subjected to thermal oxidation, thereby forming a silicon oxide film 82 to a thickness of 0.15 μm over the full surface of the silicon substrate 70 again, whereupon a silicon nitride film 84 is formed to a thickness of 0.1 μm by CVD again.

The silicon oxide film 82 and the silicon nitride film 84 are used as etching protection films as well as serving as etching masks for anisotropic wet etching at subsequent step (6) described later with reference to FIGS. 14A and 14B.

More specifically, the recess sections 54*a* for the ink supply channels 54 and the recess sections 52*a* for the pressure chambers 52, which are previously formed in step (3), are covered with the silicon oxide film 82 and the silicon nitride film 84, in order to protect the portions intended not to be etched from being etched in step (6) described below (etching protection).

Figure 13B:
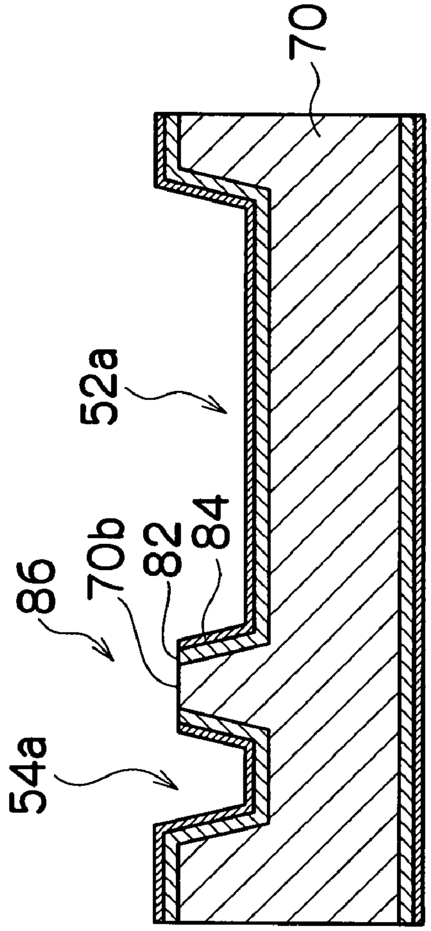
Figure 13A:
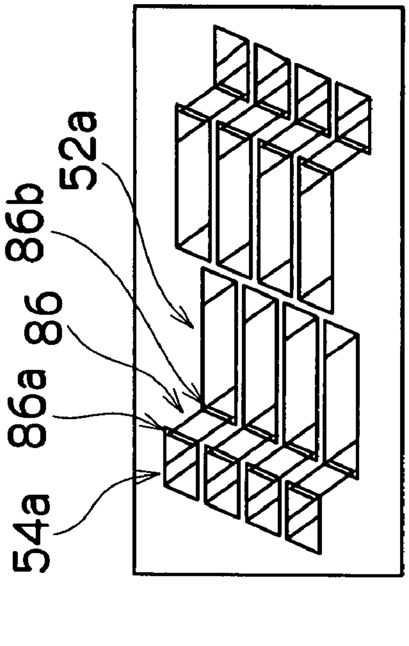

Thereupon, at step (5) shown in FIGS. 13A and 13B, in order to form (recess sections which are to become) the restrictors 53 which connect (the recess sections 54*a* which are to become) the ink supply channels 54 with (the recess sections 52*a* which are to become) the pressure chambers 52, a wet etching mask having substantially parallelogram-shaped openings is formed by photolithography so that the openings are in alignment with the <110> direction.

In order to create reliable connections between the recess sections 54*a* that are to become the ink supply channels 54 and the recess sections 52*a* that are to become the pressure chambers 52, the openings in the etching mask in the direction of connection are formed to be longer than the length of the openings of the recess sections that are to become the restrictors 53 in the direction of connection, in such a manner that at least a portion of each opening of the etching mask corresponding to the restrictors overlaps with the recess section 54*a* and the recess section 52*a*.

More specifically, the silicon substrate 70 (more accurately, the silicon nitride film 84 formed in step (4) described above) is coated with a photosensitive photoresist by spin coating or spray coating, and the photosensitive resist film is then patterned by using a photomask having openings corresponding to the restrictors. Thereupon, the silicon nitride film 84 and the silicon oxide film 82 formed at step (4) are patterned by using the photosensitive resist film thus patterned. Finally, the photosensitive resist film is removed by using a resist stripping liquid or an oxygen plasma, or the like, openings corresponding to the restrictors are formed, and the surface 70*b* of the silicon substrate is exposed as shown in FIG. 13B.

In the photo mask for forming restrictors, the size (length) of opening corresponding to the restrictor pattern to be greater than the distance between the ink supply channels 54 and the pressure chambers 52 (the distance between the recess sections 54*a* and 52*a*). In other words, after patterning the photosensitive resist film by photolithography, the opening corresponding to the restrictor section is formed in the photosensitive resist film in such a manner that the opening corresponding to the restrictor section overlaps with the recess sections 54*a* that are to become the ink supply channels 54 and the recess sections 52*a* that are to become the pressure chambers 52 at sections 86*a* and 86*b*, as shown in FIG. 13A. By providing such overlap sections 86*a* and 86*b* in this way, it is possible to reliably connect the three flow channels (the ink supply channel 54, the restrictor 53 and the pressure chamber 52) in the wet etching process in step (4). The amount of overlap between the ink supply channel 54 and the restrictor 53 (the width of the overlap section 86*a*) is preferably not less than 2 μm, and more preferably approximately 5 μm. Similarly, the amount of overlap between the pressure chamber 52 and the resistor 53 (the width of the overlap section 86*b*) is preferably not less than 2 μm, and more preferably, approximately 5 μm.

This is because, if the amount of overlap is less than 2 μm, then cases may occur where at least one of the two connecting sections may not be connected in the wet etching process for forming the restrictor pattern. In this case, although connections may be created by performing excess etching, etching also progresses in the (111) planes and it is no longer possible to form the restrictors to the desired shape, dimensions and dimensional accuracy. Consequently, the amount of overlap is preferably equal to or greater than 2 μm.

Although the amount of overlap is preferably equal to or greater than 2 μm and each of the overlap sections 86*a* and 86*b* needs to be intersected with corresponding one edge (the wall face) of the recess sections 54*a* and 52*a*, the amount of overlap is adjusted in such a manner that the overlap sections 86*a* and 86*b* are not intersected with the neighboring edge. This is in order to avoid affecting the other etching steps.

The sections where the opening of the patterned resist film overlaps with the recess sections having been formed are the forward-tapered faces in step (3), and provided that the recess section has a depth equal to or greater than 20 μm, it is desirable to coat the surface of the silicon substrate with the resist film by using a spray coating method.

However, if the uneven silicon substrate (having recess sections) is coated with the resist film by a spray coating method, then depending on the shape of the step (the shape of the recess section), it is difficult to cover completely the portion intended to be protected, with the resist film. In particular, it is difficult to cover perpendicular walls (vertical walls) with the resist film. The silicon nitride film and the silicon oxide film located below the portions covered with the resist film serve as etching protection films for the wet etching process in the subsequent step (6).

In the present embodiment, it is possible to coat with the resist film the surface of the silicon substrate and the forward-tapered walls following the (111) plane that is inclined with respect to the surface of the (110) silicon substrate. However, it is difficult to coat with the resist film the forward tapered surfaces following the (111) plane and the surface following the (111) plane that is perpendicular to the substrate (namely, the perpendicular wall face in the vicinity of the forward tapered surface on the side where the restrictor pattern is formed, of the pair of forward tapered surfaces).

If the tapered surfaces and the perpendicular surfaces described above are not completely coated with the resist film, and the silicon nitride film is exposed after patterning the resist film (and before patterning the silicon nitride film), then desirably, the silicon nitride film is patterned by dry etching with a gas of the type described in step (2) while applying a bias voltage to the substrate. In the dry etching process described above, the reactive gas collides with the tapered surfaces or the surface of the substrate, but the gas is not liable to collide with the perpendicular walls. Therefore, even if the silicon nitride film is exposed on the perpendicular walls, etching of the film does not progress to a significant extent, and it is possible to make the silicon nitride film remain on the perpendicular walls after the patterning of the silicon nitride film. Furthermore, in the subsequent patterning of the silicon oxide film as well, by performing dry etching with a gas of the type described in step (2) while applying a bias voltage to the substrate, it is possible to make the silicon oxide film remain on the perpendicular walls described above, after patterning of the silicon oxide film.

On the other hand, since the overlap section of the restrictor shape pattern in the forward tapered sections is covered with the resist film and is exposed to light during patterning of the resist film, then the silicon nitride film and the silicon oxide film are liable to be exposed after patterning the resist film. However, even if the silicon nitride film and the silicon oxide film are exposed, the tapered surfaces follow the (111) plane, and during the wet etching process in step (6), etching of the tapered surfaces following (111) surfaces hardly progresses at all during the time period for wet etching of the restrictors envisaged in the present invention (up to approximately 30 minutes). Consequently, there is little possibility that the shape of the recess sections are disrupted.

In a case where the portion intended to be covered with the resist film is completely covered after the patterning of the resist film, it is possible to pattern both the silicon nitride film and the silicon oxide film formed at step (4) by wet etching. Here, the method for patterning the silicon nitride film and the silicon oxide film by means of wet etching is as described in step (2) above.

Figure 14A:
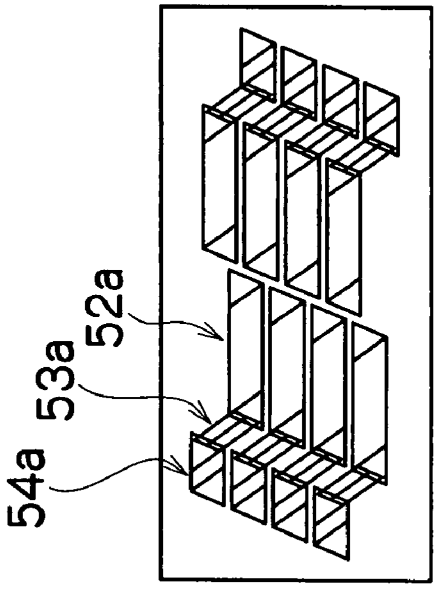
Figure 14B:
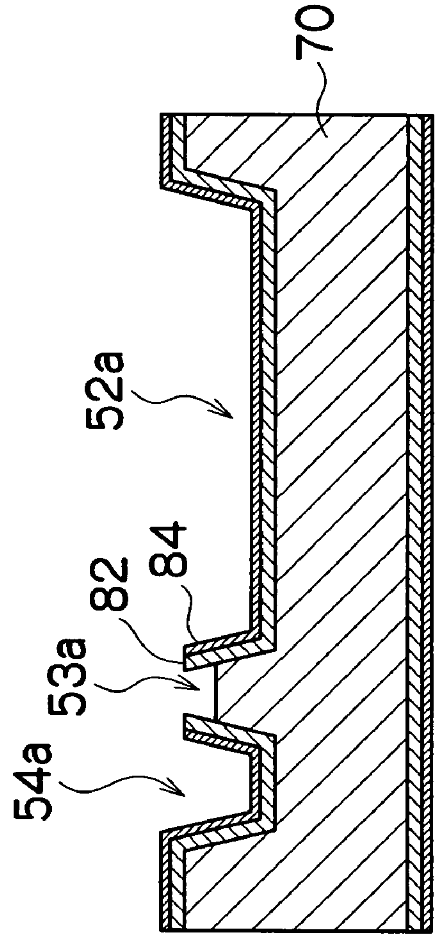

Thereupon, at step (6) shown in FIGS. 14A and 14B, recess sections 53*a* that are to become the restrictors 53 are formed by performing anisotropic wet etching. The wet etching conditions (in other words, the type of etchant and the temperature and concentration of etchant) are as described in step (3).

The restrictors 53 having an opening width of 100 μm (and a depth of approximately 35 μm) can be formed in approximately 20 minutes in the (110) silicon substrate by using an aqueous solution of potassium hydroxide having a temperature of 70° C. and concentration of 40% (etching rate: approximately 1.7 μm/min).

By using the restrictor pattern shape and the arrangement (alignment with the <110> orientation) according to the present embodiment, etching is automatically halted when the two (111) planes formed by etching intersect with each other, and therefore it is not necessary to provide an etching stop layer in the depth direction of the restrictors.

Furthermore, with regard to the length direction of the restrictors 53, since etching is stopped in the length direction by the etching protection films (etching mask) described in step (4), then it is possible to specify the length of the restrictor 53 by means of the distance between the ink supply channel 54 and the pressure chamber 52 in the photo mask used in step (2).

One portion of the tapered surface on the side of the ink supply channel 54 at the connecting section between the ink supply channel 54 and the restrictor 53, and one portion of the tapered surface on the side of the pressure chamber 52 at the connecting section between the pressure chamber 52 and the restrictor 53, are exposed to the etchant during the anisotropic wet etching for forming the restrictors 53. However, since both of these exposed surfaces are the (111) planes, then the etching does not proceed to a substantial extent. Furthermore, even if etching does proceed, it proceeds at a position where the two portions described above are deeper than the bottom of the restrictor 53, and therefore it does not have any effect on the length of the restrictor 53.

Figure 15B:
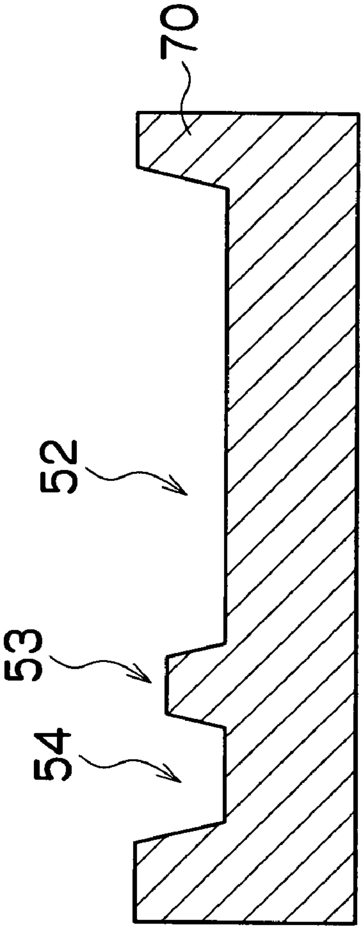
Figure 15A:
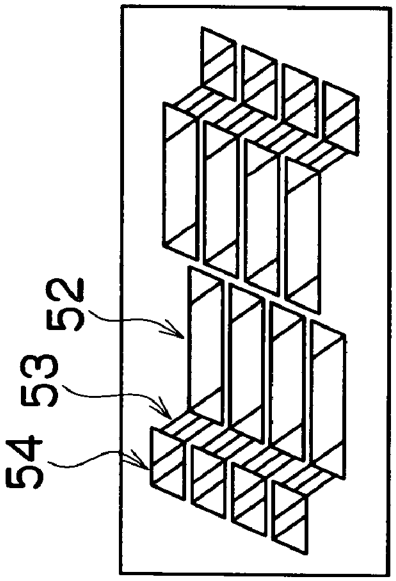
Figure 16:
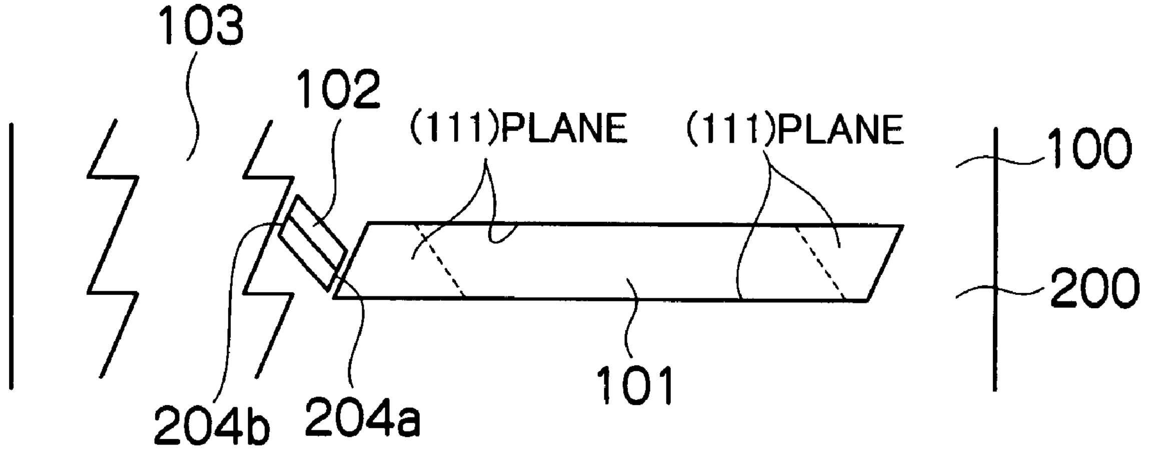
FIG.16 RELATED ART
FIG. 16 is an illustrative diagram showing a method of manufacturing an inkjet head in the related art.

Finally, at step (7) shown in FIGS. 15A and 15B, the silicon nitride film 84 and the silicon oxide film 82 are removed, thereby forming the ink supply channels 54, the pressure chambers 52, and the restrictors 53 connecting the ink supply channels 54 with the corresponding pressure chambers 52.

In this case, the silicon nitride film 84 and the silicon oxide film 82 are removed in the same manner as described above in step (2). If it is necessary to carry out hydrophilic processing or ink resistant processing on the inner surfaces of the flow channel, then, for example, the processed silicon substrate may be subjected to thermal oxidation, thereby forming a silicon oxide film on the surface. The material used in this process may also be a silicon nitride film or silicon carbide film, or the like, apart from a silicon oxide film, and the forming method used may be a diffusion method, CVD, or sputtering, or the like.

In this way, the silicon substrate is obtained in which the ink supply channels 54, the restrictors 53 and the pressure chambers 52 are formed as shown in FIG. 1, and the nozzle flow channels 51*a* are further formed in the silicon substrate. The nozzle plate formed with the nozzles 51 which are to be connected with the corresponding pressure chambers 52 through the nozzle flow channels 51*a*, are attached to the silicon substrate, on the lower side of the pressure chambers 52. The diaphragm 56, and the piezoelectric elements 58 and the piezo cover 59 on the diaphragm 56, are then attached to the silicon substrate on the upper side of the pressure chambers 52, thereby forming the inkjet head. There are no particular restrictions on the method of forming the nozzles 51, the piezoelectric elements 58, and the like.

As described above, according to the present embodiment, other portions apart from the restrictors including the recess sections which are to become the ink supply channels, the pressure chambers, are formed firstly, whereupon the restrictors are formed lastly, and furthermore the restrictor patterns are made to overlap with the recess sections of the portions apart from the restrictors.

Consequently, since the processing faces of the recess sections apart from the restrictors are situated at positions which are deeper than the bottoms of the restrictors, etching proceeds at a position deeper than the restrictors and hence there is no effect on the dimension of the restrictors in the length direction. Furthermore, since the restrictor sections (and in particular, the flow channel connecting sections) are not exposed to the etchant for a long period of time, then a beneficial effect is obtained in that the shape of the restrictors can be maintained readily. As a result of this, it is possible to guarantee the shape, dimensions and dimensional accuracy of the restrictors. Furthermore, it is possible to reduce manufacturing costs at the same time as achieving high-density arrangement of the pressure chambers.

The method of manufacturing a liquid ejection head according to the present invention has been described in detail above, but the present invention is not limited to the aforementioned examples, and it is of course possible for improvements or modifications of various kinds to be implemented, within a range which does not deviate from the essence of the present invention.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing a liquid ejection head comprising: a pressure chamber which stores liquid; a liquid supply channel which supplies the liquid to the pressure chamber; a restrictor which connects the liquid supply channel with the pressure chamber; and an ejection port which ejects droplets of the liquid in the pressure chamber supplied from the liquid supply channel through the restrictor, the method comprising the steps of:

forming first spaces for the liquid supply channel and the pressure chamber in a silicon substrate by performing anisotropic etching on a surface of the silicon substrate, the surface of the silicon substrate being parallel to a Si(110) plane, each of the first spaces being defined by two vertical walls and two inclined walls, each of the two vertical walls being parallel to a Si(111) plane that is perpendicular to the surface of the silicon substrate, each of the two inclined walls being parallel to a Si(111) plane that is inclined with respect to the surface of the silicon substrate;

then forming an etching protection film on the silicon substrate, the etching protection film protecting the silicon substrate from being etched;

then forming an opening corresponding to a second space for the restrictor in the etching protection film, the opening having a length longer than the second space and having overlap portions that overlap with the first spaces; and then performing anisotropic etching on the surface of the silicon substrate through the opening of the etching protection film to form the second space in the silicon substrate, the second space for the restrictor being defined by two inclined walls each of which is parallel to the Si(111) plane that is inclined with respect to the surface of the silicon substrate, the second space connecting the first spaces for the liquid supply channel and the pressure chamber with each other.

2. The method as defined in claim 1, wherein:

in the step of forming the opening, the opening is formed in the etching protection film by photolithography as a substantially parallelogram-shaped opening aligned with a <110> direction of the silicon substrate; and in the step of performing the anisotropic etching, the etching protection film having the opening is used as a wet etching mask.

3. The method as defined in claim 1, wherein in the step of forming the opening, the opening is formed to have the overlap portions overlapping with the first spaces by at least 2 μm.

4. The method as defined in claim 1, wherein in the step of forming the opening, the opening is formed to have the overlap portions overlapping with the first spaces by approximately 5 μm.

5. The method as defined in claim 1, wherein in the step of forming the opening, the opening is formed to have the overlap portions overlapping with the first spaces by an amount adjusted in such a manner that each of the overlap portions of the opening is intersected with one of wall faces defining one of the first spaces and is apart from others of the wall faces adjacent to the one of the wall faces.

* * * * *